(12) United States Patent
Huisman et al.

(10) Patent No.: US 7,282,467 B2
(45) Date of Patent: Oct. 16, 2007

(54) CATALYSTS SUPPORT, A SUPPORTED GROUP VIII METAL CATALYST AND PRECURSOR THEREOF, PROCESSES FOR THEIR PREPARATIONS, AND USE OF THE SUPPORTED GROUP VIII METAL CATALYST

(75) Inventors: Hans Michiel Huisman, The Hague (NL); Gerardus Petrus Lambertus Niesen, Amsterdam (NL); Johannes Jacobus Maria Van Vlaanderen, Amsterdam (NL)

(73) Assignee: Shell Oil Company, Houston, TX (US)

(*) Notice: Subject to any disclaimer, the term of this patent is extended or adjusted under 35 U.S.C. 154(b) by 368 days.

(21) Appl. No.: 10/332,094

(22) PCT Filed: Jul. 10, 2001

(86) PCT No.: PCT/EP01/07938

§ 371 (c)(1),
(2), (4) Date: Feb. 13, 2003

(87) PCT Pub. No.: WO02/05958

PCT Pub. Date: Jan. 24, 2002

(65) Prior Publication Data

US 2003/0158271 A1 Aug. 21, 2003

(30) Foreign Application Priority Data

Jul. 14, 2000 (EP) .................................. 00305993

(51) Int. Cl.
*B01J 23/00* (2006.01)
*B01J 21/00* (2006.01)

(52) U.S. Cl. ...................... 502/326; 502/330; 502/331; 502/337; 502/338; 502/339; 502/350; 502/439

(58) Field of Classification Search ................ 502/350, 502/439, 326, 330, 331, 337, 338, 339; 501/134; 423/598, 610; 264/12, 13, 211.12, 211.13
See application file for complete search history.

(56) References Cited

U.S. PATENT DOCUMENTS

| | | | | |
|---|---|---|---|---|
| 2,952,644 A | * | 9/1960 | Holden ........................ 502/314 |
| 3,442,715 A | * | 5/1969 | Deibert et al. ................ 502/4 |
| 4,102,822 A | * | 7/1978 | Mulaskey ..................... 502/322 |
| 4,659,690 A | * | 4/1987 | McDaniel et al. ........... 502/439 |
| 4,705,767 A | * | 11/1987 | Cheng et al. ................ 502/167 |
| 5,362,700 A | * | 11/1994 | Doumaux, Jr. .............. 502/208 |
| 5,925,284 A | * | 7/1999 | Sherman et al. ............ 252/179 |
| 5,965,481 A | | 10/1999 | Durand et al. .............. 502/304 |
| 6,562,120 B2 | * | 5/2003 | Emery et al. ................ 106/436 |
| 6,592,787 B2 | * | 7/2003 | Pickrell et al. ............. 264/44 |

FOREIGN PATENT DOCUMENTS

| | | |
|---|---|---|
| EP | 0 071 770 A2 | 7/1982 |
| EP | 0 167 215 A2 | 1/1986 |
| EP | 0 168 894 A2 | 1/1986 |
| EP | 0 178 008 A1 | 4/1986 |
| EP | 0 363 537 A1 | 4/1990 |
| EP | 0 398 420 A3 | 11/1990 |
| EP | 0 482 818 A1 | 4/1992 |
| EP | 0 498 976 A1 | 8/1992 |
| EP | 0 624 399 A1 | 11/1994 |
| EP | 0 638 361 A1 | 2/1995 |
| EP | 1301278 | 10/2006 |
| JP | 61/000447 | 1/1986 |
| JP | A1984121014 | 1/1986 |
| WO | 99/34917 | 7/1999 |
| WO | WO200183108 | 11/2001 |
| WO | WO200205958 | 1/2002 |

* cited by examiner

*Primary Examiner*—Cam N. Nguyen

(57) ABSTRACT

A process for preparing a catalyst support or a supported Group VIII metal catalyst or a precursor of the supported Group VIII metal catalyst, which process comprises (a) exerting mechanical power on a mixture comprising a refractory oxide and a first liquid to obtain a dough, (b) admixing the dough with a second liquid to obtain a slurry, (c) shaping and drying the slurry, and (d) calcining.

43 Claims, No Drawings

CATALYSTS SUPPORT, A SUPPORTED GROUP VIII METAL CATALYST AND PRECURSOR THEREOF, PROCESSES FOR THEIR PREPARATIONS, AND USE OF THE SUPPORTED GROUP VIII METAL CATALYST

FIELD OF THE INVENTION

The present invention relates to a catalyst support, a supported Group VIII metal catalyst and a precursor of the supported Group VIII metal catalyst. The invention also relates to processes for the preparation of the said support, catalyst and precursor. Further, the invention relates to a use of the supported Group VIII metal catalyst, in particular in a process for the preparation of hydrocarbons from synthesis gas.

BACKGROUND OF THE INVENTION

The catalytic preparation of hydrocarbons from synthesis gas, i.e. a mixture of carbon monoxide and hydrogen, is well known in the art and is commonly referred to as Fischer-Tropsch synthesis.

Catalysts suitable for use in a Fischer-Tropsch synthesis process typically contain a catalytically active metal of Group VIII of the Periodic Table of the Elements (Handbook of Chemistry and Physics, 68th edition, CRC Press, 1987-1988) supported on a refractory oxide, such as alumina, titania, zirconia, silica or mixtures of such oxides. In particular, iron, nickel, cobalt and ruthenium are well known catalytically active metals for such catalysts. Reference may be made to EP-A-398420, EP-A-178008, EP-A-167215, EP-A-168894, EP-A-363537, EP-A-498976, EP-A-71770 and WO-99/34917.

In the Fischer-Tropsch synthesis, as in many other chemical reactions, the supported catalyst, the reactants and a diluent, if present, in contact with one another usually form a three phase system of gas, liquid and solid. Such three phase systems may be operated, for example, in a packed-bed reactor or in a slurry-bubble reactor. A packed-bed reactor may comprise a packed bed of solid catalyst particles through which there is a flow of gaseous and liquid reactants. A slurry-bubble reactor may comprise a continuous phase of liquid with the solid catalyst suspended therein and gaseous reactants flowing as bubbles through the liquid. In all such operations it is important that the supported catalyst is mechanically strong, so that the catalyst particles maintain their integrity through the entire operation. The stronger the catalyst support or the supported catalyst, the higher a catalyst bed may be in a packed-bed reactor or the longer the residence time of the catalyst may be in a slurry-bubble reactor.

Further, there is a continuous interest in finding catalysts for use in the Fischer-Tropsch synthesis which provide an improved activity and an improved selectivity in the conversion of carbon monoxide into valuable hydrocarbons, in particular hydrocarbons containing 5 or more carbon atoms ("$C_5$+ hydrocarbons" hereinafter), and minimise the formation of carbon dioxide, which is a carbon containing by-product of low value, or even negative value.

SUMMARY OF THE INVENTION

In accordance with the present invention catalyst supports and catalysts can be made which have unexpectedly an improved strength, whilst the catalysts exhibit an improved performance in the Fischer-Tropsch synthesis as regards activity and selectivity. The invented process involves reducing the particle size of the refractory oxide support by milling a mixture of the refractory support and liquid such that a dough is obtained, admixing the dough with a further liquid to obtain a slurry, shaping and drying the slurry, and calcining. A catalytically active metal may be introduced in any stage of the process or subsequently, as the metal itself or as a precursor compound.

DETAILED DESCRIPTION OF THE INVENTION

Catalysts made in accordance with this invention have an improved performance over the catalysts which are made by the methods of WO-99/34917. The methods of WO-99/34917 include shaping a dough without prior addition of further liquid to the dough, and shaping a slurry without applying an intermediate step of milling a dough.

An additional beneficial effect of the invention is that the particles have a higher density, so that more of the catalyst can be employed in a given reactor volume.

A further aspect of the invention is that the improved catalyst properties can be obtained without the need of introducing a further, i.e. different element into the support or the catalyst. This is advantageous because the presence of such a further element could influence catalyst properties unpredictably in an adverse manner.

Thus, the present invention provides a process for preparing a catalyst support or a supported Group VIII metal catalyst or a precursor of the supported Group VIII metal catalyst, which process comprises
(a) exerting mechanical power on a mixture comprising a refractory oxide and a first liquid to obtain a dough,
(b) admixing the dough with a second liquid to obtain a slurry,
(c) shaping and drying the slurry, and
(d) calcining, on the understanding that, if a supported Group VIII metal catalyst or a precursor of the supported Group VIII metal catalyst is prepared, a precursor compound of the Group VIII metal or the Group VIII metal itself is present as an additional component in step (a) or step (b).

The invention also relates to the support, to the supported Group VIII metal catalyst and to the precursor thereof which are obtainable by this process. The invention also relates to the use of the supported Group VIII metal catalyst in a three phase chemical process, in particular to a process for producing hydrocarbons, which process comprises contacting a mixture of carbon monoxide and hydrogen at elevated temperature and pressure with a supported catalyst according to the invention.

In this invention a refractory oxide is used. Examples of suitable refractory oxides include alumina, silica, titania, zirconia or mixtures thereof, such as silica-alumina or physical mixtures such as a mixture of silica and titania. Preferably, the refractory oxide comprises titania, zirconia or mixtures thereof, in particular the refractory oxide is a titania.

According to a preferred embodiment, the refractory oxide comprising titania, zirconia or mixtures thereof, may further comprise up to 50% w of another refractory oxide, typically silica or alumina, based on the total weight of the refractory oxide. More preferably, the additional refractory oxide, if present, comprises up to 20% w, even more preferably up to 10% w, on the same basis.

The refractory oxide most preferably consists of titania, in particular titania which has been prepared in the absence of sulphur-containing compounds. An example of such preparation method involves flame hydrolysis of titanium tetrachloride.

The titania may be a rutile type titania, but preferably it comprises anatase type titania. In particular at least 50%, more in particular at least 90% of the titania is anatase type. Most preferably, the titania is exclusively anatase type.

The refractory oxide is preferably a material which has a large surface area. The surface area is typically at least 0.5 $m^2/g$, suitably at least 10 $m^2/g$, especially at least 25 $m^2/g$, and more specially at least 35 $m^2/g$, based on BET surface area measurements according to ASTM D3663-92. Suitably the surface area is at most 400 $m^2/g$, especially at most 200 $m^2/g$, on the same basis. Preferably the surface area is in the range of from 40 $m^2/g$ to 100 $m^2/g$, on the same basis.

The particle size of the refractory oxide is also not material to the invention and may be selected within wide ranges, for example below 1 mm, typically in the range of from 0.1 to 100 μm, preferably in the range of from 0.5 to 50 μm.

Particle sizes as specified in this patent document are invariably the volume average particle diameters as determined by using a MASTERSIZER MICRO PLUS instrument (trademark of Malvern Instruments, Ltd., United Kingdom; using the calculation method designated "5THD" and supplied by Malvern Instruments Ltd.); the material to be measured is diluted with further liquid as already present (water in the Examples I, II and III presented hereinafter) to achieve the prescribed optical density and the particle size is subsequently measured within 30 seconds).

The first liquid and the second liquid independently may be organic liquids, such as a lower alcohol, a lower ketone, a lower ester, or a lower ether, for example ethanol, acetone, methyl ethyl ketone, ethyl acetate, diethyl ether or tetrahydrofuran. In this patent document, when the term "lower" is used in conjunction with an organic compound the term specifies that the organic compound has at most six carbon atoms, in particular four carbon atoms. More suitable first and second liquids are aqueous liquids, such as a mixture of the organic liquid and water, preferably comprising at least 50% w of water and less than 50% w of the organic liquid, based on the total weight of the liquid. In particular the aqueous liquids are water. It is preferred that the first liquid and the second liquid are of the same composition. Most suitably, water is used as the first liquid and as the second liquid.

In step (a) of the present process mechanical power is exerted on the mixture to obtain a dough. The mechanical power may be exerted by methods known to the skilled person, such as by kneading or mulling. Suitable apparatus are a Z blade mixer or sigma blade mixer and a rotating wheel mixer-muller.

Typically, the mechanical power is exerted on the mixture for a period of from 5 minutes to 2 hours, or longer, such as up to 5 hours, but preferably for a period of from 15 to 90 minutes. This step may be carried out over a broad range of temperatures, preferably from 15 to 90° C. As a result of the input of energy into the mixture, there will be an increase of the temperature.

The solids content of the dough as prepared in step (a) is not material to the invention and may be selected within wide ranges. Typically the solids content is at least 60% w, for example in the range of from 65 to 90% w, on the basis of the total weight of the dough. Preferably the solids content is in the range of from 65 to 85% w, on the same basis. The solids content of a mixture (dough or slurry) as defined in this patent document is determined as the weight of the residue which is formed after heating the mixture for 2 hours at 600° C., whereby the heating may be preceded by drying at milder conditions if desirable.

The particle size of the solid material present in the dough is typically at most 5 μm, for example in the range of from 0.05 to 3 μm, preferably in the range of from 0.1 to 1 μm. The particle size reduction which occurs as a result of exerting the mechanical power during step (a) may be quantified by the ratio of the particle size at the end of step (a) over the particle size at the start of step (a). This ratio is typically in the range of 0.02 to 0.5, in particular in the range of from 0.05 to 0.2.

The quantity of second liquid admixed in step (b) is not material to the invention. Suitably the quantity of second liquid is at least 0.1 part by weight (pbw) per pbw of the dough, and the quantity of second liquid is typically at most 60 pbw per pbw of the dough. For example, the quantity of second liquid is in the range of from 0.5 to 20 pbw per pbw of the dough, in particular from 1 to 10 pbw per pbw of the dough.

Independently, the quantity of liquid may be such that the solids content of the slurry prepared in step (b) is at most 55% w, for example in the range of from 1 to 45% w, relative to the weight of the slurry. Suitably the quantity is selected in accordance with the shaping method selected for application in step (c). For example, when the shaping method is spraying, such as applied in a spray-drying operation, the solids content of the slurry is typically in the range of from 5 to 35% w, preferably of from 15 to 30% w, relative to the weight of the slurry.

The mixing of step (b) may be carried out by any suitable method known to the skilled person. The skilled person will appreciate that preferably a homogeneous mixture of the dough and the second liquid is obtained, i.e. a mixture which is free of lumps. Stirring by means of a radial turbine, an anchor stirrer or a marine impeller is suitable. Typically, a mixing time of 5 to 120 minutes will be suitable, in particular from 15 to 90 minutes. The mixing may be carried out over a broad range of temperatures, preferably from 15 to 90° C.

Any suitable shaping and drying methods may be applied in step (c). For example, the slurry may be dried to form a cake and crushed. Drying may be effected at an elevated temperature, for example above 30° C., preferably up to 500° C., more preferably up to 300° C. The period for drying is typically up to 5 hours, more preferably from 15 minutes to 3 hours.

Preferably, shaping and drying is carried out in a single operation, for example by spray-drying.

It is preferred to include one or more flow improving agents and/or extrusion aids, peptising agents and burn-out materials in the slurry prior to extrusion. Such additives and their use are known in the art, cf. for example WO-99/34917. Very suitable peptising agents for use in this invention are weak acids, in particular acids having a pKa of at least 0, suitably at most 8, preferably in the range of 0.5 to 6, when measured in water at 25° C. More in particular, carboxylic acids are of interest, for example formic acid, acetic acid, citric acid, oxalic acid and propionic acid.

The shaped and dried compositions of step (c) is calcined in step (d). Calcination is effected at elevated temperature, preferably at a temperature between 400 and 750° C., more preferably between 450 and 650° C. The duration of the calcination is typically from 5 minutes to several hours, preferably from 15 minutes to 4 hours. Suitably, the calcination is carried out in an oxygen-containing atmosphere, preferably air. If desired, the drying of step (c) and the calcination may be combined.

It will be appreciated that the most preferred way of carrying out the process may vary, depending e.g. on the desired size and shape of the catalyst particles. It belongs to the skill of the skilled person to select the most suitable method for a given set of circumstances and requirements.

Preferably, the catalyst is obtained in the form of a powder, in which case spray-drying is a preferred method for application in step (c).

The particle size of the powder obtained after shaping, drying and calcining is typically in the range of from 5 to 200 µm, preferably in the range of from 10 to 100 µm. It is advantageous to employ the catalyst in the form of such a powder in a chemical process under a slurry regime, for example in a slurry-bubble reactor.

Alternative shapes are pellets, saddles and cylinders, which may be suitable for use in a chemical process under a fixed-bed regime, for example in a packed-bed rector. Less preferably, the catalyst is obtained as a lumpy material without a well defined shape.

A supported catalyst or a precursor thereof may be made which contains a catalytically active metal or a precursor of the catalytically active metal. The catalytically active metal is a Group VIII metal, as in many chemical reactions, such as Fischer-Tropsch synthesis and hydrogenations, a supported Group VIII metal catalyst is used.

For use in the Fischer-Tropsch synthesis it is preferred that the Group VIII metal is selected from iron, nickel, cobalt and ruthenium. More preferably, cobalt or ruthenium is selected as the Group VIII metal, because cobalt based catalysts and ruthenium based catalysts give a relatively high yield of $C_5+$ hydrocarbons. Most preferably, cobalt is selected as the Group VIII metal. A further metal may be present in order to improve the activity of the catalyst or the selectivity of the conversion of synthesis gas into hydrocarbons. Suitable further metals may be selected from manganese, vanadium, zirconium, rhenium, scandium and ruthenium. A preferred further metal is manganese or vanadium, in particular manganese.

The amount of the Group VIII metal present in the supported metal catalyst may vary widely. Typically, the supported Group VIII metal catalyst comprises from 1 to 50% w of the Group VIII metal, in particular when the catalyst is used in the Fischer-Tropsch synthesis, based on the weight of the Group VIII metal relative to the weight of supported Group VIII metal catalyst, preferably 3 to 40% w, more preferably 5 to 30% w on the same basis. The amount of the further metal, if present, is typically from 0.05 and 60% w, more typically from 0.1 to 25% w, based on the weight of the further metal relative to the weight of supported Group VIII metal catalyst. The atomic ratio of the Group VIII metal to the further metal, as present in the catalyst, is typically at least 5:1 and it is typically at most 200:1.

The supported Group VIII metal catalyst may suitably be prepared by methods known to the skilled person.

It is preferred to introduce the catalytically active components or precursors thereof by having them present as an additional component in step (b) or more preferably already in step (a). A less preferred alternative is that the catalytically active components or precursors may be deposited onto the support after the calcination of step (d). The term "catalytically active components" includes any catalytically active metal, i.e. the Group VIII metal and any further metal, as present in the supported metal catalyst. The term also includes precursor compounds of the catalytically active metal. It is not excluded that, in addition to the catalytically active components and the support, the supported metal catalyst comprises further components.

Suitable catalytically active components include salts of the catalytically active metal, such as nitrates, carbonates and acetates, hydroxides and oxides of the catalytically active metal, and the catalytically active metal itself. The catalytically active components may or may not be soluble in the first or second liquid, or they may be partially soluble in the first or second liquid.

If the catalytically active components or precursors are introduced to the support after the calcination of step (d), conventional methods may be applied. Such conventional methods involve, for example, precipitating the catalytically active components or precursors onto the support; spray-coating, kneading and/or impregnating the catalytically active components or precursors onto the support; and/or extruding one or more catalytically active components or precursors together with support material to prepare extrudates.

A conventional method of preparing the supported Group VIII metal catalyst is by impregnating onto the catalyst support the catalytically active components or precursors as aqueous solutions. In case a cobalt and manganese containing supported catalyst is to be prepared, most preferably a highly concentrated solution is employed. A suitable method to arrive at such a concentrated solution is to use a mixture of molten cobalt nitrate and manganese nitrate salts. The impregnation treatment is typically followed by drying and, optionally, calcining. For drying and calcining typically the same conditions may be applied as described hereinbefore.

Now turning to a use of the supported Group VIII metal catalyst of this invention, as indicated hereinbefore, the supported Group VIII metal catalyst may be used to catalyse a process for the preparation of hydrocarbons from carbon monoxide and hydrogen. Typically, when in use in that process, at least part of the Group VIII metal is present in its metallic state.

Therefore, it is normally advantageous to activate the supported Group VIII metal catalyst prior to use by a reduction, in the presence of hydrogen at elevated temperature. Typically, the reduction involves treating the catalyst at a temperature in the range from 100 to 450° C., at elevated pressure, typically from 1 to 200 bar abs, frequently for 1 to 200 hours. Pure hydrogen may be used in the reduction, but it is usually preferred to apply a mixture of hydrogen and an inert gas, like nitrogen. The relative amount of hydrogen present in the mixture may range between 0.1 and 100% v.

According to a preferred embodiment of the reduction, the catalyst is brought to the desired temperature and pressure level in a nitrogen gas atmosphere. Subsequently, the catalyst is contacted with a gas mixture containing only a small amount of hydrogen gas, the rest being nitrogen gas. During the reduction, the relative amount of hydrogen gas in the gas mixture is gradually increased up to 50% v or even 100% v.

It may be preferred to activate the supported Group VIII metal catalyst in-situ, that is inside the reactor for the preparation of hydrocarbons from synthesis gas. For example, WO-97/17137 describes an in-situ catalyst activation process which comprises contacting the catalyst in the presence of hydrocarbon liquid with a hydrogen-containing gas at a hydrogen partial pressure of at least 15 bar abs., preferably at least 20 bar abs., more preferably at least 30 bar abs. Typically, in this process the hydrogen partial pressure is at most 200 bar abs.

The process for the preparation of hydrocarbons from synthesis gas is typically carried out at a temperature in the range of from 125 to 350° C., preferably from 175 to 275° C. The pressure is typically in the range of from 5 to 150 bar abs., preferably from 5 to 80 bar abs., in particular from 5 to 50 bar abs.

Hydrogen and carbon monoxide (synthesis gas) is typically fed to the process at a molar ratio in the range from 0.7 to 2.5. Low hydrogen to carbon monoxide molar ratios will increase the $C_5+$ selectivity of the catalysts, i.e. the selectivity of the formation of $C_5+$ hydrocarbons.

However, in the embodiment of the invention in which the Group VIII metal is cobalt and the further metal is manganese and/or vanadium, which are present in an atomic ratio of cobalt/(manganese+vanadium) of at least 12:1, the $C_5+$ selectivity of the catalyst is remarkably high, even when using synthesis gas having a high hydrogen to carbon monoxide atomic ratio. In this embodiment the hydrogen to carbon monoxide molar ratio in the range of from 1.5 to 2.5 may be used.

The gas hourly space velocity ("GHSV" hereinafter) may vary within wide ranges and is typically in the range from 400 to 10000 Nl/l/h, for example from 400 to 4000 Nl/l/h.

The term "GHSV" is well known in the art, and relates to the gas per hour space velocity, i.e. the volume of synthesis gas in Nl (i.e. at the standard temperature of 0° C. and the standard pressure of 1 bar (100,000 Pa)) which is contacted in one hour with one liter of catalyst particles, i.e. excluding inter-particular void spaces. In the case of a fixed bed catalyst, the GHSV is usually expressed as per liter of catalyst bed, i.e. including inter-particular void space. In that case a GHSV of 1600 Nl/l/h on catalyst particles corresponds to about 1000 Nl/l/h on catalyst bed.

The process for the preparation of hydrocarbons may be conducted using a variety of reactor types and reaction regimes, for example a fixed bed regime, a slurry phase regime or an ebulliating bed regime. It will be appreciated that the size of the catalyst particles may vary depending on the reaction regime they are intended for. It belongs to the skill of the skilled person to select the most appropriate catalyst particle size for a given reaction regime.

Further, it will be understood that the skilled person is capable to select the most appropriate conditions for a specific reactor configuration, the reaction regime and a work-up scheme. For example, the preferred gas hourly space velocity may depend upon the type of reaction regime that is being applied. Thus, if it is desired to operate the hydrocarbon synthesis process with a fixed bed regime, preferably the gas hourly space velocity is chosen in the range from 500 to 2500 Nl/l/h. If it is desired to operate the hydrocarbon synthesis process with a slurry phase regime, preferably the gas hourly space velocity is chosen in the range from 1500 to 7500 Nl/l/h.

It is a particular aspect of the invention that the catalyst support and the supported Group VIII metal catalyst have an increased strength. Therefore, when in a chemical process a fixed bed regime is applied the catalyst bed can have more height, or when an slurry phase or an ebulliating bed regime is applied there is less attrition of catalyst particles. Less attrition may lead, advantageously, to a longer permissible residence time of the supported catalyst in the reactor, and/or to the less formation of fines. When there is less formation of fines there will be less danger that fine particles will pass the filter in a filtration step for removal of catalyst particles. It is preferred to use the supported metal catalyst of this invention in a slurry phase regime.

The invention will now be illustrated further by means of the following Examples.

EXAMPLE I

A dough was prepared by admixing and kneading in a kneading apparatus 120 parts by weight (pbw) of commercially available titania powder (P25 ex. Degussa, BET surface area 50 m2/g (ASTM D3663-92), particle size 7 μm), 50 pbw of commercially available $Co(OH)_2$ powder (particle size 4 μm), 5.3 pbw of $Mn(Ac)_2.4H_2O$ ("Ac" means acetate; soluble in water) and 50 pbw of water. The kneading was continued until the particle size of the solids was 2 μm. Water (650 pbw) was added to the dough and the dough/water mixture was homogenised by means of a turbine stirrer, to form a slurry. The particle size of the solids present in the slurry was unchanged. The slurry was sprayed-dried through an atomizer. The resulting particles were calcined in air for 1 hour at 600° C. The particle size of the resulting powder was 30 μm. The catalyst precursor so obtained was subjected to various tests.

The particle density was found to be 2.38 g/ml.

The strength of the particles was tested by subjecting a slurry containing 5% v of the particles in water to high shear forces during 30 minutes, by means of a high-speed mixer operating at 5750 rpm. The temperature of the slurry is maintained at 20° C. The size of the fresh particles and of the particles after the shear treatment was measured. It was found that the shear treatment applied during the test had caused a 5% decrease in the particle size.

The catalyst precursor was reduced and tested in a process for the preparation of hydrocarbons. A micro-flow reactor containing 10 ml of the particles in the form of a fixed bed was heated to a temperature of 260° C., and pressurised with a continuous flow of nitrogen gas to a pressure of 2 bar abs. The catalyst precursor was reduced in-situ for 24 hours with a mixture of nitrogen and hydrogen gas. During reduction the relative amount of hydrogen in the mixture was gradually increased from 0% v to 100% v. The water concentration in the off-gas was kept below 3000 ppmv.

Following reduction the pressure was increased to 31 bar abs. The preparation of hydrocarbons was carried out with a mixture of hydrogen and carbon monoxide at a H2/CO ratio of 1.1:1. The GHSV amounted to 7700 Nl/l/h. The reaction temperature, expressed as the weighted average bed temperature, was 232° C. The space time yield, expressed as grams hydrocarbon product per liter catalyst particles (including the voids between the particles) per hour; the selectivity of methane, expressed in % mole methane obtained relative to the number of moles CO converted; and the selectivity to hydrocarbons containing 5 or more carbon atoms ($C_5+$ selectivity), expressed as a weight percentage of the total hydrocarbon product, were determined after 40 hours of operation. The results are set out in Table I.

EXAMPLE II (COMPARATIVE)

Example I was substantially repeated but with the differences that
(1) the quantity of water present during the admixing of the catalyst ingredients was 620 pbw, instead of 50 pbw. Consequently a slurry was directly obtained, instead of a dough, which was milled by using a ball mill until the particle size was 2 μm.
(2) during the preparation of hydrocarbons the reaction temperature was 239° C., instead of 232° C.

The particle size of the powder after the calcination was 30 μm. The particle density was found to be 1.31 g/ml. An 80% decrease in the particle size was caused in the shear treatment test. Further results are set out in Table I.

TABLE I

| Example | I | II*) |
|---|---|---|
| Space time yield (g/l.h) | 1130 | 510 |
| Selectivity methane (% mole) | 4.8 | 11.0 |
| C$_5$+ selectivity (% w) | 90.1 | 80.7 |

*)Comparative

EXAMPLE III (COMPARATIVE)

A catalyst precursor was prepared as set out in Example I but with the difference that the dough prepared as in Example I was extruded to obtain an extrudate, which extrudate was subsequently dried, calcined (as in Example I) and milled to a particle size of 58 μm, instead of adding water to the dough to obtain a slurry, spray-drying and calcining.

The particle density was found to be 2.14 g/ml. An 83% decrease in the volume weighted average particle diameter was caused in the shear treatment test carried out as in Example I.

It will be appreciated that in various aspects the catalyst of Example I, i.e. according to the invention, is much better than the catalysts of Examples II and III, i.e. the comparative catalysts. The invention provides a stronger catalyst and a catalyst which has a higher density. Using the catalyst according to the invention, the hydrocarbon production rate is higher, although the temperature was lower. The hydrocarbon production rate is higher on a catalyst weight basis and on a catalyst volume basis. Further, the selectivity to hydrocarbons containing 5 or more carbon atoms was better and the better selectivity is attributable only partly to the lower temperature.

In the preparation of the catalyst precursors of Example I and Example II mechanical power was exerted on the refractory oxide to obtain particles of the same size. Although the size of the particles was the same, after shaping, drying and calcining the catalyst according to the invention was better than the comparative catalyst.

We claim:

1. A process for preparing a catalyst support comprising:
   a) exerting mechanical power on a mixture comprising a refractory oxide and a first liquid to obtain a dough;
   b) admixing the dough obtained from step (a) with a second liquid to obtain a slurry;
   c) shaping and drying the slurry obtained from step (b); and
   d) calcining.

2. The process of claim 1, wherein the refractory oxide comprises titania.

3. The process of claim 1, wherein the first liquid and the second liquid are water.

4. The process of claim 1, wherein the solids content of the dough as prepared in step (a) is in the range of from 65% wt to 90% wt.

5. The process of claim 1, wherein the quantity of second liquid admixed instep (b) is in the range of from 0.5 to 20 part by weight (pbw) per pbw of the dough.

6. The process of claim 1, wherein the particle size of the refractory oxide applied in step (a) is in the range of from 0.1 μm to 100 μm.

7. The process of claim 1, wherein the ratio of the particle size of the particles present at the end of step (a) over the particle size of the particles present at the start of step (a) is in the range of from 0.02 to 0.5.

8. The process of claim 1, wherein step (c) is a spray-drying process.

9. The process of claim 1 further comprising depositing a Group VIII metal or precursor thereof on the catalyst support.

10. The process of claim 1, wherein the slurry in step (b) has a solids content of at most 55wt %, relative to the weight of the slurry.

11. A process for preparing a supported catalyst or a precursor thereof comprising:
   a) exerting mechanical power on a mixture comprising a refractory oxide, a first liquid and a Group VIII metal or precursor thereof to obtain a dough;
   b) admixing the dough obtained from step a) with a second liquid to obtain a slurry;
   c) shaping and drying the slurry obtained from step b); and,
   d) calcining.

12. The process of claim 11, wherein the refractory oxide comprises titania.

13. The process of claim 11, wherein the first liquid and the second liquid are water.

14. The process of claim 11, wherein the solids content of the dough as prepared in step (a) is in the range of from 65% wt to 90% wt.

15. The process of claim 11, wherein the quantity of second liquid admixed in step (b) is in the range of from 0.5 to 20 part by weight (pbw) per pbw of the dough.

16. The process of claim 11, wherein the particle size of the refractory oxide applied in step (a) is in the range of from 0.1 μm to 100 μm.

17. The process of claim 11, wherein the ratio of the particle size of the particles present at the end of step (a) over the particle size of the particles present at the start of step (a) is in the range of from 0.02 to 0.5.

18. The process of claim 11, wherein step (c) is a spray-drying process.

19. The process of claim 11, wherein the slurry in step (b) has a solids content of at most 55 wt %, relative to the weight of the slurry.

20. The process of claim 11, wherein the Group VIII metal is cobalt.

21. The process of claim 11, wherein the Group VIII metal is present at least partly in metallic form.

22. A supported catalyst or a precursor thereof prepared by a process comprising:
   a) exerting mechanical power on a mixture comprising a refractory oxide, a first liquid and a Group VIII metal or precursor thereof to obtain a dough;
   b) admixing the dough obtained from step a) with a second liquid to obtain a slurry;
   c) shaping and drying the slurry obtained from step b); and,
   d) calcining to form a powder, wherein the powder obtained has a particle size in the range of from 5 to 200 um.

23. The supported catalyst or the precursor thereof of claim 22, wherein the Group VIII metal is cobalt.

24. The supported catalyst or the precursor thereof of claim 22, wherein the Group VIII metal is present at least partly in metallic form.

25. The supported catalyst or the precursor thereof of claim 22, wherein the refractory oxide comprises titania.

26. The supported catalyst or the precursor thereof of claim 22, wherein the first liquid and the second liquid are water.

27. The supported catalyst or the precursor thereof of claim 22, wherein the solids content of the dough as prepared in step (a) is in the range of from 65% wt to 90% wt.

28. The supported catalyst or the precursor thereof of claim 22, wherein the quantity of second liquid admixed in step (b) is in the range of from 0.5 to 20 part by weight (pbw) per pbw of the dough.

29. The supported catalyst or the precursor thereof of claim 22, wherein the particle size of the refractory oxide applied in step (a) is in the range of from 0.1 µm to 100 µm.

30. The supported catalyst or the precursor thereof of claim 22, wherein the ratio of the particle size of the particles present at the end of step (a) over the particle size of the particles present at the start of step (a) is in the range of from 0.02 to 0.5.

31. The supported catalyst or the precursor thereof of claim 22, wherein step (c) is a spray-drying process.

32. The supported catalyst or the precursor thereof of claim 22, wherein the slurry in step (b) has a solids content of at most 55 wt %, relative to the weight of the slurry.

33. A process for preparing a supported catalyst or a precursor thereof comprising:
   a) exerting mechanical power on a mixture comprising a refractory oxide and a first liquid to obtain a dough;
   b) admixing the dough obtained from step a) with a second liquid and a Group VIII metal or precursor thereof to obtain a slurry;
   c) shaping and drying the slurry obtained from step b); and,
   d) calcining.

34. The process of claim 33, wherein the refractory oxide comprises titania.

35. The process of claim 33, wherein the first liquid and the second liquid are water.

36. The process of claim 33, wherein the solids content of the dough as prepared in step (a) is in the range of from 65% wt to 90% wt.

37. The process of claim 33, wherein the quantity of second liquid admixed in step (b) is in the range of from 0.5 to 20 part by weight (pbw) per pbw of the dough.

38. The process of claim 33, wherein the particle size of the refractory oxide applied in step (a) is in the range of from 0.1 µm to 100 µm.

39. The process of claim 33, wherein the ratio of the particle size of the particles present at the end of step (a) over the particle size of the particles present at the start of step (a) is in the range of from 0.02 to 0.5.

40. The process of claim 33, wherein step (c) is a spray-drying process.

41. The process of claim 33, wherein the slurry in step (b) has a solids content of at most 55 wt %, relative to the weight of the slurry.

42. The process of claim 11, wherein the Group VIII metal is cobalt.

43. The process of claim 11, wherein the Group VIII metal is present at least partly in metallic form.

* * * * *